Patented Nov. 14, 1950

2,529,982

UNITED STATES PATENT OFFICE 2,529,982

1-o-AMINOBENZOYL-2-β-HYDROXYETHYL-PIPERIDINE

Lewis A. Walter, East Orange, N. J., assignor to Maltbie Laboratories, Inc., a corporation of New Jersey No Drawing. Application October 15, 1949, Serial No. 121,629

1 Claim. (Cl. 260—294)

This invention relates to a new and useful organic compound, 1-o-aminobenzoyl-2-β-hydroxyethylpiperidine which is represented by the formula

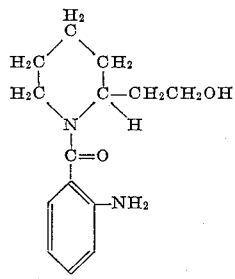

This novel compound is a valuable intermediate in the preparation of certain useful pharmaceutical chemicals. Its use is illustrated by the fact that it rearranges in the presence of only one equivalent of strong acid to give the corresponding salt of the o-aminobenzoic ester in excellent yield. For example the compound of the present invention may be treated in solution, in various solvents, preferably in isopropanol, according to the following reaction:

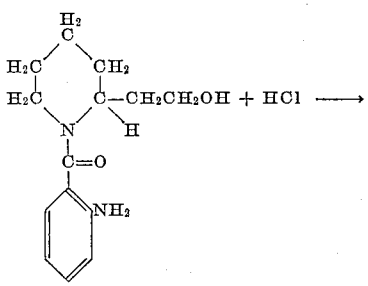

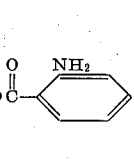

to give β-2-piperydyl ethyl-o-amino benzoate hydrochloride which is valuable as an anesthetic. By this procedure it is possible to avoid the use of o-nitrobenzoyl chloride (which is expensive and very dangerous to prepare) and which has heretofore been deemed necessary in the preparation of such compound.

The following example illustrates one method of preparing the compound of my invention.

One hundred thirty (130) grams of β-2-piperidyl ethanol and 50 ml. absolute dioxane were stirred in a flask and 55 g. of isatoic anhydride was added. The temperature rose to 40–50° with the vigorous evolution of carbon dioxide. When the reaction moderated the temperature was raised to 60–70° for ten minutes and the mixture was diluted with water to incipient turbidity at 40–45°. On slowly cooling to 0°, 60–65 g. of product crystallized out. This material is suitable for most purposes but it may be purified by crystallization from 2-butanone to give pure 1-o-aminobenzoyl-2-β-hydroxyethylpiperidine, M. P. 85–86° C. Analyzed for nitrogen, theory, 11.38%. Found, 11.35%.

What is claimed is:

1-o-aminobenzoyl - 2 - β - hydroxyethylpiperidine represented by the formula:

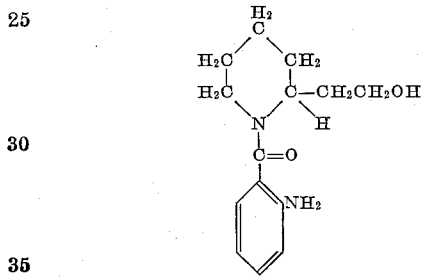

LEWIS A. WALTER.

REFERENCES CITED

The following references are of record in the file of this patent:

UNITED STATES PATENTS

| Number | Name | Date |
|---|---|---|
| 2,229,533 | Walter et al. | Jan. 21, 1941 |

OTHER REFERENCES

Vassiliades, Bull. Soc. Chem. de France (5th Series), vol. 4 (1937), pages 1131–1136.